United States Patent
Ueki

(10) Patent No.: US 12,508,674 B2
(45) Date of Patent: Dec. 30, 2025

(54) DETECTION METHOD OF RESISTIVITY AND PROCESSING METHOD OF PLATE-SHAPED WORKPIECE

(71) Applicant: DISCO CORPORATION, Tokyo (JP)

(72) Inventor: Atsushi Ueki, Tokyo (JP)

(73) Assignee: DISCO CORPORATION, Tokyo (JP)

(*) Notice: Subject to any disclaimer, the term of this patent is extended or adjusted under 35 U.S.C. 154(b) by 214 days.

(21) Appl. No.: 18/327,146

(22) Filed: Jun. 1, 2023

(65) Prior Publication Data

US 2023/0398641 A1 Dec. 14, 2023

(30) Foreign Application Priority Data

Jun. 13, 2022 (JP) ................................ 2022-095217

(51) Int. Cl.
*B23K 31/12* (2006.01)
*B23K 26/40* (2014.01)
(Continued)

(52) U.S. Cl.
CPC ......... *B23K 31/12* (2013.01); *G01N 21/9501* (2013.01); *B23K 26/40* (2013.01);
(Continued)

(58) Field of Classification Search
CPC .... B23K 31/12; B23K 2101/40; B23K 26/40; G01N 21/9501; G01N 21/45; G01N 21/59
See application file for complete search history.

(56) References Cited

U.S. PATENT DOCUMENTS 6,407,546 B1 * 6/2002 Le .......................... G01B 7/105
324/202
6,447,695 B1 * 9/2002 Motonari ................. C09G 1/02
438/692

(Continued)

FOREIGN PATENT DOCUMENTS

JP 2002192370 A 7/2002
JP 2012021916 A * 2/2012 ............. G01B 11/06
JP 2013258253 A * 12/2013

OTHER PUBLICATIONS

Shibesh Dutta, Kiroubanand Sankaran, Kristof Moors, Geoffrey Pourtois, Sven Van Elshocht, Jürgen Bömmels, Wilfried Vandervorst, Zsolt Tőkei, Christoph Adelmann; Thickness dependence of the resistivity of platinum-group metal thin films. J. Appl. Phys. Jul. 14, 2017; 122 (2): 025107. (Year: 2017).*

(Continued)

*Primary Examiner* — Tarifur R Chowdhury
*Assistant Examiner* — Kaitlyn E Kidwell
(74) *Attorney, Agent, or Firm* — GREER BURNS & CRAIN, LTD.

(57) ABSTRACT

A detection method of resistivity is a detection method of resistivity in which resistivity of a plate-shaped workpiece having a back surface and a front surface on a side opposite to the back surface is detected. The detection method includes an interference waveform acquisition step of irradiating the back surface of the plate-shaped workpiece with light from a light source and acquiring an interference waveform between light reflected by the back surface and light that has been transmitted through the back surface and been reflected by the front surface, and an estimation step of estimating the resistivity of the plate-shaped workpiece on the basis of the interference waveform acquired in the interference waveform acquisition step.

16 Claims, 10 Drawing Sheets

(51) Int. Cl.
*B23K 101/40* (2006.01)
*G01N 21/45* (2006.01)
*G01N 21/59* (2006.01)
*G01N 21/95* (2006.01)

(52) U.S. Cl.
CPC .......... *B23K 2101/40* (2018.08); *G01N 21/45* (2013.01); *G01N 21/59* (2013.01)

(56) References Cited

U.S. PATENT DOCUMENTS

| | | | | |
|---|---|---|---|---|
| 7,106,425 | B1* | 9/2006 | Bultman ............ | G01N 21/9501 356/73 |
| 2009/0182528 | A1* | 7/2009 | De Groot ............... | G01B 11/06 702/167 |
| 2011/0019190 | A1* | 1/2011 | Sakai .................. | G01N 21/9501 356/243.1 |
| 2020/0217641 | A1* | 7/2020 | Kimura .................. | G02B 27/14 |
| 2020/0290157 | A1* | 9/2020 | Okuma ................ | B23K 26/032 |

OTHER PUBLICATIONS

Lacy, F. Developing a theoretical relationship between electrical resistivity, temperature, and film thickness for conductors. Nanoscale Res Lett 6, 636 (2011). (Year: 2011).*
H.-D Liu, Y.-P Zhao, G Ramanath, S.P Murarka, G.-C Wang. Thickness dependent electrical resistivity of ultrathin (<40 nm) Cu films. Thin Solid Films vol. 384, Issue 1, Mar. 1, 2001, pp. 151-156. (Year: 2001).*
Van Bui et al. On the difference between optically and electrically determined resistivity of ultra-thin titanium nitride films. Applied Surface Science. vol. 269, Mar. 15, 2013, pp. 45-49 (Year: 2013).*
Quinten, M. On the use of fast Fourier transform for optical layer thickness determination. SN Appl. Sci. 1, 823 (2019). https://doi.org/10.1007/s42452-019-0866-9 (Year: 2019).*

* cited by examiner

DETECTION METHOD OF RESISTIVITY AND PROCESSING METHOD OF PLATE-SHAPED WORKPIECE

BACKGROUND OF THE INVENTION

Field of the Invention

The present invention relates to a detection method of resistivity and a processing method of a plate-shaped workpiece.

Description of the Related Art

A technique has been proposed in which, in order to manufacture chips from a semiconductor wafer, irradiation with a laser beam having transmissibility with respect to the wafer is executed to form modified layers inside the wafer which is a plate-shaped workpiece, and the wafer is divided into chips with use of the modified layers at which strength and so forth have lowered as points of origin (for example, refer to Japanese Patent Laid-open No. 2002-192370).

In forming a modified layer, if the wafer is doped with an impurity, the transmittance and refractive index of the laser beam differ depending on the amount and so forth of the impurity with which the wafer is doped. Hence, there are problems that, even with wafers of the same thickness, the position of a focal point changes and it may be impossible to form a modified layer at a proper position, and that absorption of the laser beam increases and therefore it may be impossible to form a modified layer at a deep position in a thickness direction.

To address the above-described problems, a processing method of a wafer by which a modified layer can be formed under an appropriate processing condition corresponding to an impurity added to a wafer has been proposed (for example, refer to Japanese Patent Laid-open No. 2013-258253).

SUMMARY OF THE INVENTION

However, the method described in Japanese Patent Laid-open No. 2013-258253 has a problem that processing needs to be executed on an outer circumferential surplus region in advance.

Because the electrical resistivity changes when an impurity is added to a wafer, a method in which the resistivity is measured in advance by using a measuring instrument such as a resistivity meter is also used. However, there exists a problem that wafers need to be sorted out for on the basis of the measured resistivity and that management becomes cumbersome.

Accordingly, an object of the present invention is to provide a detection method of resistivity and a processing method of a plate-shaped workpiece that allow determination of the resistivity corresponding to processability of the plate-shaped workpiece without processing the plate-shaped workpiece.

In accordance with an aspect of the present invention, there is provided a detection method of resistivity in which resistivity of a plate-shaped workpiece having a first surface and a second surface on a side opposite to the first surface is detected, the detection method including an interference waveform acquisition step of irradiating the first surface of the plate-shaped workpiece with light from a light source and acquiring an interference waveform between light reflected by the first surface and light that has been transmitted through the first surface and been reflected by the second surface, and an estimation step of estimating the resistivity of the plate-shaped workpiece on the basis of the interference waveform acquired in the interference waveform acquisition step.

Preferably, in the estimation step, the resistivity of the plate-shaped workpiece is estimated based on a maximum value of the interference waveform acquired in the interference waveform acquisition step.

Preferably, the detection method of resistivity further includes a storing step of executing the interference waveform acquisition step for plate-shaped workpieces having various values of resistivity and storing in advance resistivity information in which the resistivity of each of the plate-shaped workpieces is associated with the maximum value of the interference waveform corresponding to the resistivity, and in the estimation step, the resistivity of the plate-shaped workpiece is calculated back based on the resistivity information stored in the storing step.

Preferably, in the estimation step, a Fourier transform of the interference waveform acquired in the interference waveform acquisition step is performed, and the resistivity of the plate-shaped workpiece is estimated based on a maximum value of a waveform obtained after the transform.

Preferably, the detection method of resistivity further includes a storing step of executing the interference waveform acquisition step for plate-shaped workpieces having various values of resistivity and storing in advance resistivity information in which the resistivity of each of the plate-shaped workpieces is associated with the maximum value of the waveform resulting from the Fourier transform of the interference waveform corresponding to the resistivity, and in the estimation step, the resistivity of the plate-shaped workpiece is calculated back based on the resistivity information stored in the storing step.

In accordance with another aspect of the present invention, there is provided a processing method of a plate-shaped workpiece in which a plate-shaped workpiece having a first surface and a second surface on a side opposite to the first surface is processed, the processing method including a resistivity detection step of detecting resistivity of the plate-shaped workpiece, a processing condition selection step of selecting a processing condition corresponding to the resistivity, and a laser beam irradiation step of irradiating the plate-shaped workpiece with a laser beam to execute processing under the processing condition selected in the processing condition selection step. The resistivity detection step includes an interference waveform acquisition step of irradiating the first surface of the plate-shaped workpiece with light from a light source and acquiring an interference waveform between light reflected by the first surface and light that has been transmitted through the first surface and been reflected by the second surface, and an estimation step of estimating the resistivity of the plate-shaped workpiece on the basis of the interference waveform acquired in the interference waveform acquisition step.

Preferably, the processing method of a plate-shaped workpiece further includes a determination step of determining whether or not processing by irradiation with the laser beam is possible for the plate-shaped workpiece having the detected resistivity, after the resistivity detection step is executed.

The present invention provides an effect that it becomes possible to determine resistivity corresponding to processability of a plate-shaped workpiece without processing the plate-shaped workpiece.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Embodiments of the present invention will be described in detail below with reference to the drawings. The present invention is not limited by contents described in the following embodiments. Further, what can easily be envisaged by those skilled in the art and what are substantially the same are included in constituent elements described below. Moreover, configurations described below can be combined as appropriate. In addition, various kinds of omission, replacement, or change of a configuration can be carried out without departing from the gist of the present invention.

First Embodiment

Figure 1:
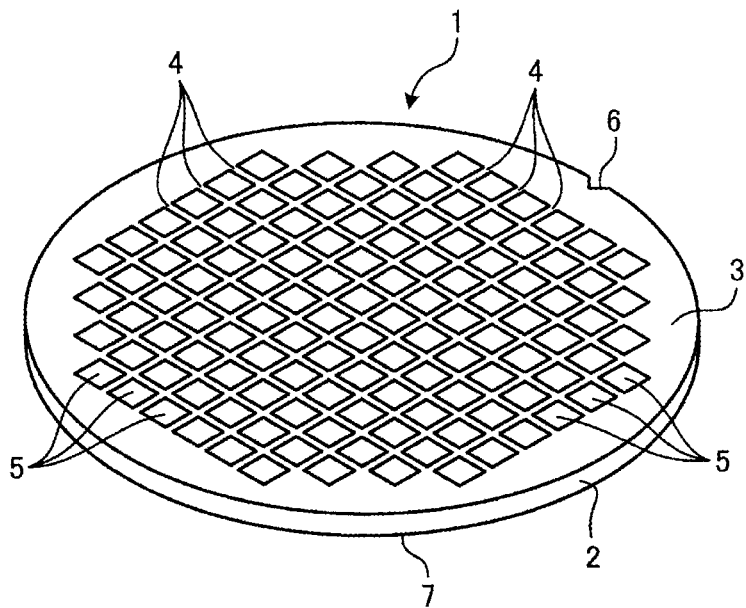
FIG. 1 is a perspective view of a plate-shaped workpiece that is a detection target of a detection method of resistivity and is a processing target of a processing method of a plate-shaped workpiece according to a first embodiment.
Figure 2:
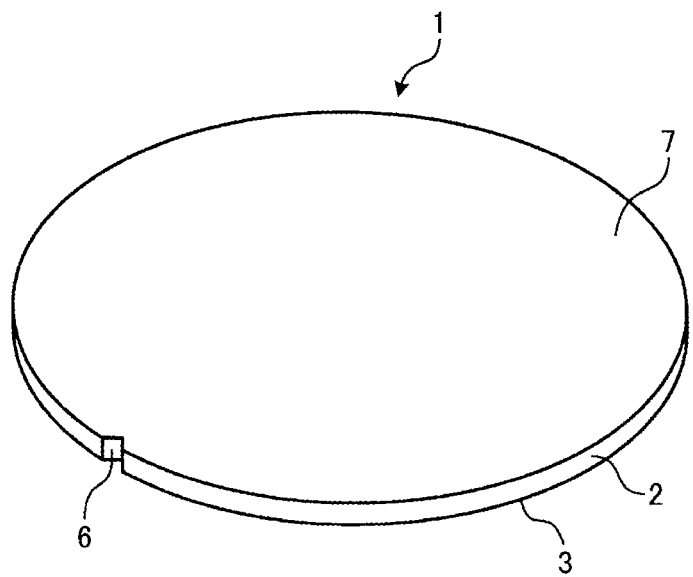
FIG. 2 is a perspective view obtained when the plate-shaped workpiece illustrated in FIG. 1 is viewed from a back surface side.

A detection method of resistivity and a processing method of a plate-shaped workpiece according to a first embodiment of the present invention will be described based on the drawings. FIG. 1 is a perspective view of a plate-shaped workpiece that is a detection target of the detection method of resistivity and a processing target of the processing method of a plate-shaped workpiece according to the first embodiment. FIG. 2 is a perspective view obtained when the plate-shaped workpiece illustrated in FIG. 1 is viewed from a back surface side.

A plate-shaped workpiece 1 that is a detection target of the detection method of resistivity and a processing target of the processing method of a plate-shaped workpiece according to the first embodiment is a wafer such as a circular plate-shaped semiconductor wafer or optical device wafer that has a substrate 2 made of silicon, gallium arsenide, silicon carbide (SiC), or the like. In the plate-shaped workpiece 1, as illustrated in FIG. 1, multiple planned dividing lines 4 that intersect each other are set in a front surface 3 that is a second surface, and devices 5 are formed in the respective regions marked out by the planned dividing lines 4.

For example, each device 5 is a circuit such as an integrated circuit (IC) or a large scale integration (LSI) circuit, an image sensor such as a charge coupled device (CCD) or a complementary metal oxide semiconductor (CMOS), or a memory (semiconductor storing device).

Further, in the first embodiment, in the plate-shaped workpiece 1, a notch 6 indicating crystal orientation is formed at an outer edge as illustrated in FIG. 1 and FIG. 2. In the plate-shaped workpiece 1, various dopants are added to the substrate 2. In the plate-shaped workpiece 1, an electrical resistance, that is, resistivity, changes depending on the amount of dopant added to the substrate 2. In the first embodiment, the plate-shaped workpiece 1 is divided into the individual devices 5 through, for example, irradiation with a laser beam 21 along the planned dividing lines 4 from a back surface 7 that is a first surface on a side opposite to the front surface 3. That is, the plate-shaped workpiece 1 has the back surface 7 that is the first surface and the front surface 3 that is the second surface on a side opposite to the back surface 7.

Figure 3:
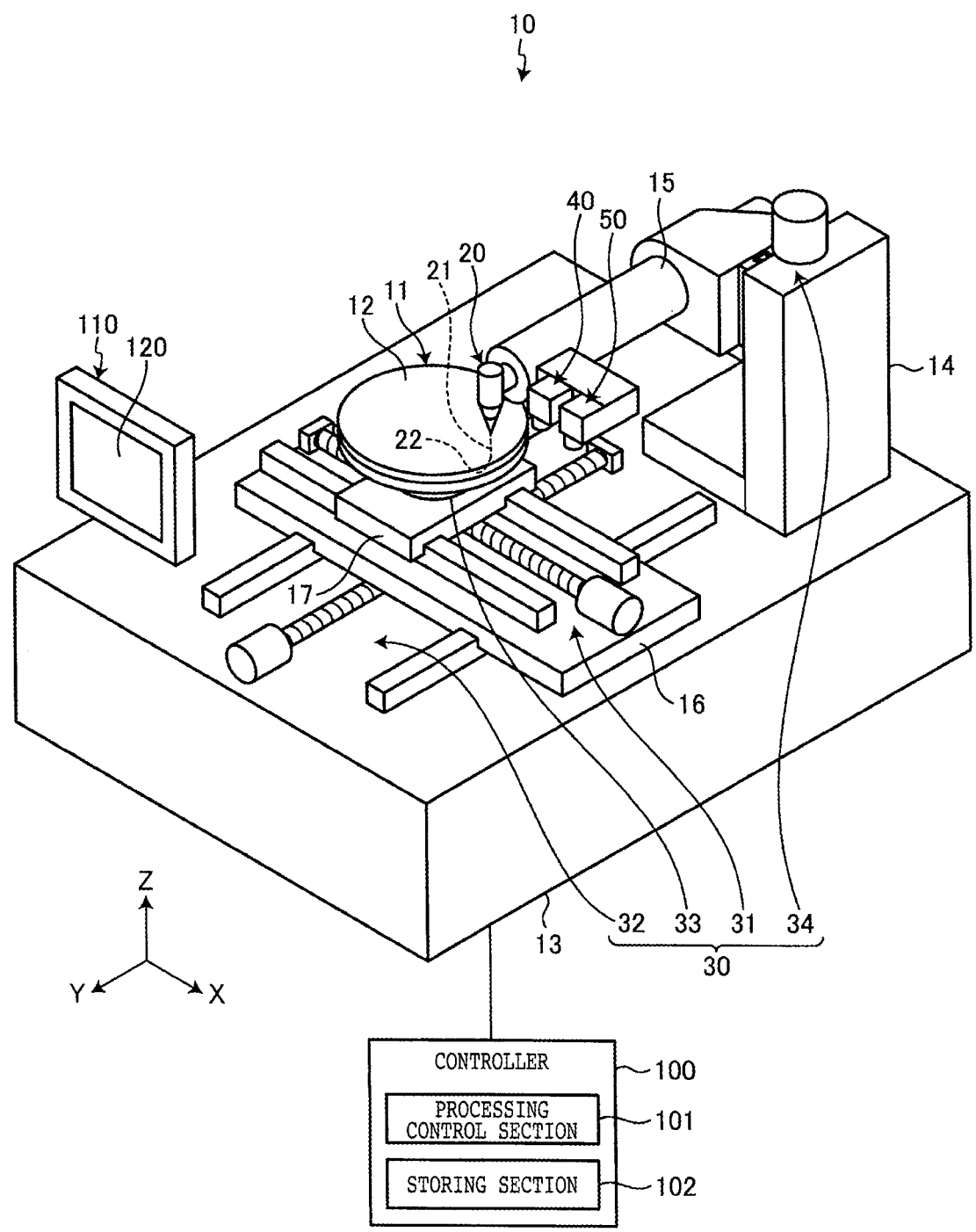
FIG. 3 is a perspective view illustrating a configuration example of a laser processing apparatus that executes the detection method of resistivity and the processing method of a plate-shaped workpiece according to the first embodiment.
Figure 4:
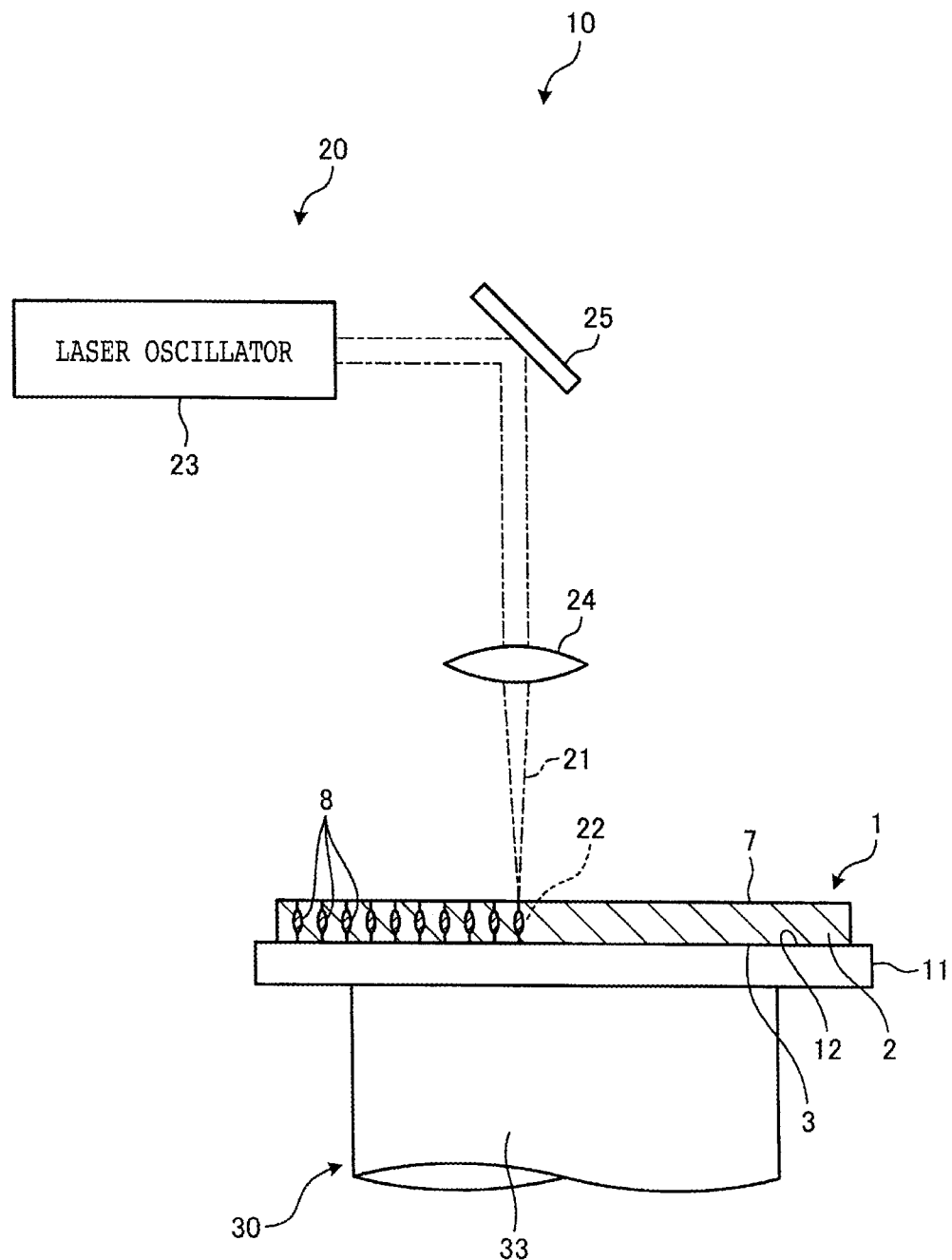
FIG. 4 is a diagram schematically illustrating a configuration of a laser beam irradiation unit of the laser processing apparatus illustrated in FIG. 3.

Next, a laser processing apparatus that executes the detection method of resistivity and the processing method of a plate-shaped workpiece according to the first embodiment will be described. FIG. 3 is a perspective view illustrating a configuration example of the laser processing apparatus that executes the detection method of resistivity and the processing method of a plate-shaped workpiece according to the first embodiment. FIG. 4 is a diagram schematically illustrating a configuration of a laser beam irradiation unit of the laser processing apparatus illustrated in FIG. 3.

A laser processing apparatus 10 illustrated in FIG. 3 is a processing apparatus that sets a focal point 22 of the pulsed laser beam 21 with a wavelength having transmissibility with respect to the substrate 2 that configures the plate-shaped workpiece 1 inside the substrate 2 from the back surface 7 of the plate-shaped workpiece 1, and executes irradiation with the laser beam 21 along the planned dividing lines 4 to form modified layers 8 (illustrated in FIG. 4) inside the substrate 2 along the planned dividing lines 4.

Each modified layer 8 means a region in which a density, a refractive index, a mechanical strength, or another physical property has become a state different from that of surrounding regions, and examples of the modified layer 8 include a melting treatment region, a crack region, a dielectric breakdown region, a refractive index change region, a region in which these regions exist in a mixed manner, and so forth. A mechanical strength of the modified layer 8 is lower than that of other parts. Further, it becomes harder to form the modified layer 8 inside the substrate 2 as the resistivity of the plate-shaped workpiece 1 becomes lower, and it becomes easier to form the modified layer 8 inside the substrate 2 as the resistivity of the plate-shaped workpiece 1 becomes higher.

As illustrated in FIG. 3, the laser processing apparatus 10 includes a holding table 11 that holds the plate-shaped workpiece 1, a laser beam irradiation unit 20, a movement unit 30, an imaging unit 40, a spectroscopic interferometer 50, and a controller 100.

The holding table 11 holds the plate-shaped workpiece 1 on a holding surface 12 thereof that lies in parallel to a horizontal direction. The holding surface 12 is formed of a porous ceramic or the like and has a circular disc shape, and is connected to a vacuum suction source, not illustrated, through a suction path, not illustrated. The holding table 11 holds under suction the plate-shaped workpiece 1 placed on the holding surface 12 through placement of the front surface 3 on the holding surface 12 and suction of the front surface 3 on the holding surface 12 by the vacuum suction source.

Moreover, the holding table 11 is rotated around its axial center that is orthogonal to the holding surface 12 and is parallel to a Z-axis direction parallel to a vertical direction, by a rotational movement unit 33 of the movement unit 30. Together with the rotational movement unit 33, the holding table 11 is moved in an X-axis direction parallel to the horizontal direction by an X-axis movement unit 31 of the movement unit 30 and is moved in a Y-axis direction that is parallel to the horizontal direction and is orthogonal to the X-axis direction by a Y-axis movement unit 32. The holding table 11 is moved, by the movement unit 30, between a processing region below the laser beam irradiation unit and a carrying-in/out region that is separate from the position below the laser beam irradiation unit 20 and to and from which the plate-shaped workpiece 1 is carried in and carried out.

The movement unit 30 relatively moves the holding table 11 and the focal point 22 of the laser beam 21 with which irradiation is executed by the laser beam irradiation unit 20, in the X-axis direction, the Y-axis direction, and the Z-axis direction and around the axial center parallel to the Z-axis direction. The X-axis direction and the Y-axis direction are directions that are orthogonal to each other and are parallel to the holding surface 12 (that is, horizontal direction). The Z-axis direction is a direction orthogonal to both the X-axis direction and the Y-axis direction.

The movement unit 30 includes the X-axis movement unit 31 that is a processing feed unit that moves the holding table 11 in the X-axis direction, the Y-axis movement unit 32 that is an indexing feed unit that moves the holding table 11 in the Y-axis direction, the rotational movement unit 33 that rotates the holding table 11 around the axial center parallel to the Z-axis direction, and a Z-axis movement unit 34 that moves the focal point 22 of the laser beam 21 of the laser beam irradiation unit 20 in the Z-axis direction.

The Y-axis movement unit 32 is the indexing feed unit that relatively moves the holding table 11 and the focal point 22 of the laser beam 21 of the laser beam irradiation unit 20 in the Y-axis direction. In the first embodiment, the Y-axis movement unit 32 is installed on an apparatus main body 13 of the laser processing apparatus 10. The Y-axis movement unit 32 supports a moving plate 16 that supports the X-axis movement unit 31, in such a manner that the moving plate 16 can move in the Y-axis direction.

The X-axis movement unit 31 is the processing feed unit that relatively moves the holding table 11 and the focal point 22 of the laser beam 21 of the laser beam irradiation unit 20 in the X-axis direction. The X-axis movement unit 31 is installed on the moving plate 16. The X-axis movement unit 31 supports a second moving plate 17 that supports the rotational movement unit 33 that rotates the holding table 11 around the axial center parallel to the Z-axis direction, in such a manner that the second moving plate 17 can move in the X-axis direction. The second moving plate 17 supports the rotational movement unit 33 and the holding table 11. The rotational movement unit 33 supports the holding table 11.

The Z-axis movement unit 34 is a feed unit that relatively moves the holding table 11 and the focal point 22 of the laser beam 21 of the laser beam irradiation unit 20 in the Z-axis direction. The Z-axis movement unit 34 is installed on an erected column 14 erected from the apparatus main body 13. The Z-axis movement unit 34 supports a support column 15 at a tip of which a collecting lens 24 to be described later and so forth in the laser beam irradiation unit 20 are disposed, in such a manner that the support column 15 can move in the Z-axis direction.

The X-axis movement unit 31 includes a well-known ball screw that is disposed rotatably around its axial center and moves the second moving plate 17 in the X-axis direction when being rotated around the axial center, a well-known pulse motor that rotates the ball screw around the axial center, and well-known guide rails that support the second moving plate 17 movably in the X-axis direction. The Y-axis movement unit 32 includes a well-known ball screw that is disposed rotatably around its axial center and moves the moving plate 16 in the Y-axis direction when being rotated around the axial center, a well-known pulse motor that rotates the ball screw around the axial center, and well-known guide rails that support the moving plate 16 movably in the Y-axis direction. The Z-axis movement unit 34 includes a well-known ball screw that is disposed rotatably around its axial center and moves the support column 15 in the Z-axis direction when being rotated around the axial center, a well-known pulse motor that rotates the ball screw around the axial center, and well-known guide rails that support the support column 15 movably in the Z-axis direction. The rotational movement unit 33 includes a motor or the like that rotates the holding table 11 around the axial center.

Further, the laser processing apparatus 10 includes an X-axis direction position detecting unit that is for detecting the position of the holding table 11 in the X-axis direction and is not illustrated, a Y-axis direction position detecting unit that is for detecting the position of the holding table 11 in the Y-axis direction and is not illustrated, and a Z-axis direction position detecting unit that is for detecting the position of the support column 15 in the Z-axis direction and is not illustrated. Each position detecting unit outputs a detection result to the controller 100.

The laser beam irradiation unit 20 is a processing unit that executes laser processing for the plate-shaped workpiece 1 by focusing the pulsed laser beam 21 on the plate-shaped workpiece 1 held on the holding surface 12 of the holding table 11 and executing irradiation. In the first embodiment, as illustrated in FIG. 3, part of the laser beam irradiation unit 20 is disposed at the tip of the support column 15 supported by the Z-axis movement unit 34 installed on the erected column 14 erected from the apparatus main body 13.

As illustrated in FIG. 4, the laser beam irradiation unit 20 includes a laser oscillator 23 that emits the pulsed laser beam 21 and the collecting lens 24 that is a light collector that focuses the laser beam 21 emitted from the laser oscillator 23 and irradiates the plate-shaped workpiece 1 with the laser beam 21. In the first embodiment, the laser beam irradiation unit 20 includes a mirror 25 that reflects the laser beam 21 emitted by the laser oscillator 23 toward the collecting lens 24.

The imaging unit 40 images the plate-shaped workpiece 1 held by the holding table 11. The imaging unit 40 is an infrared camera including an imaging element such as a charge coupled device (CCD) imaging element or a CMOS imaging element that images a space an objective lens faces in the Z-axis direction. In the first embodiment, as illustrated in FIG. 3, the imaging unit 40 is disposed at the tip of the support column 15, and the objective lens is disposed at a position that lines up with the collecting lens 24 of the laser beam irradiation unit 20 along the X-axis direction.

The imaging unit 40 acquires an image obtained by imaging by the imaging element and outputs the acquired image to the controller 100. Further, the imaging unit 40 images the plate-shaped workpiece 1 held on the holding surface 12 of the holding table 11 to acquire an image for performing alignment to execute position adjustment between the plate-shaped workpiece 1 and the laser beam irradiation unit 20, and outputs the acquired image to the controller 100.

Figure 5:
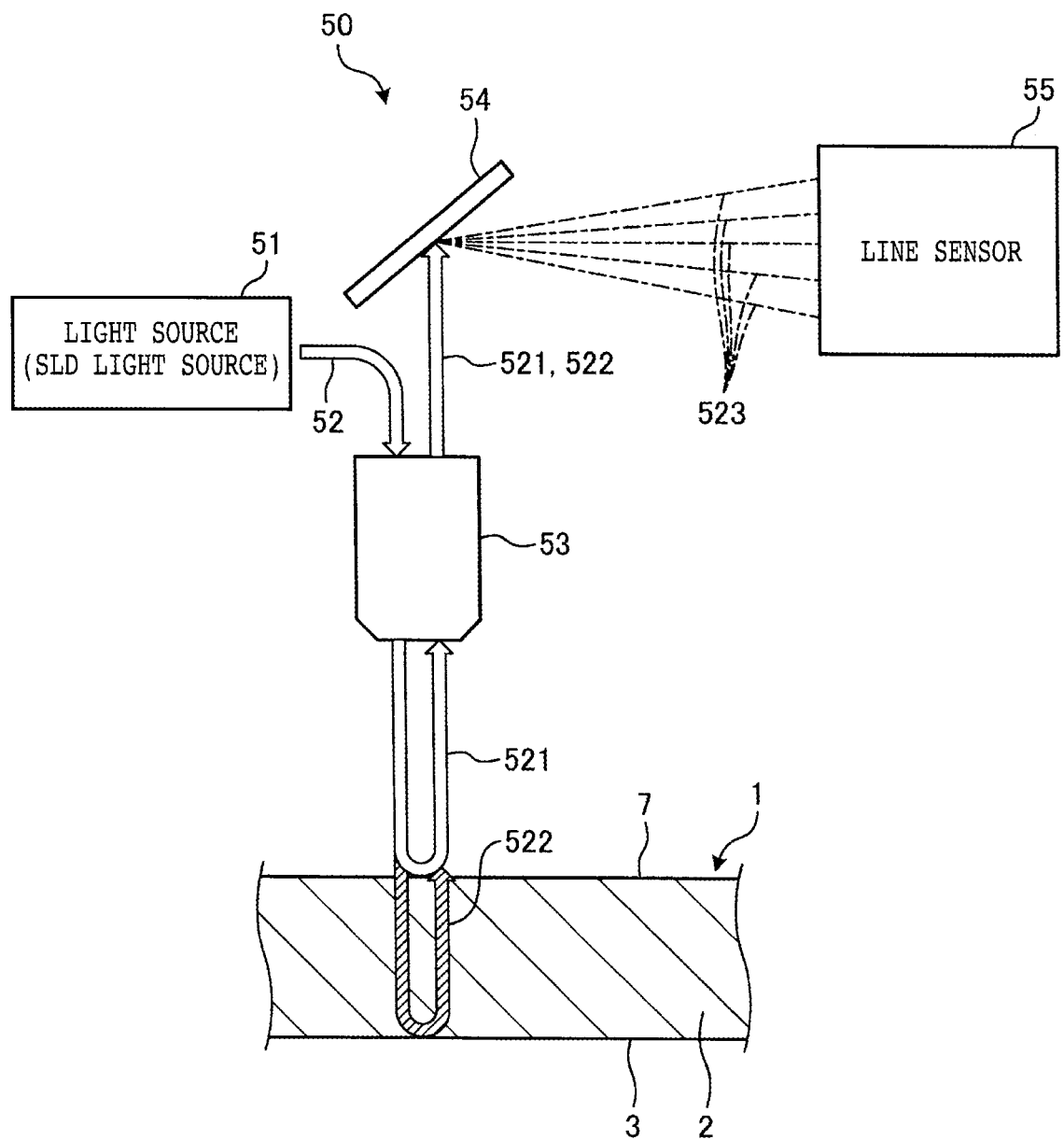
FIG. 5 is a diagram schematically illustrating a configuration of a spectroscopic interferometer of the laser processing apparatus illustrated in FIG. 3.
Figure 6:
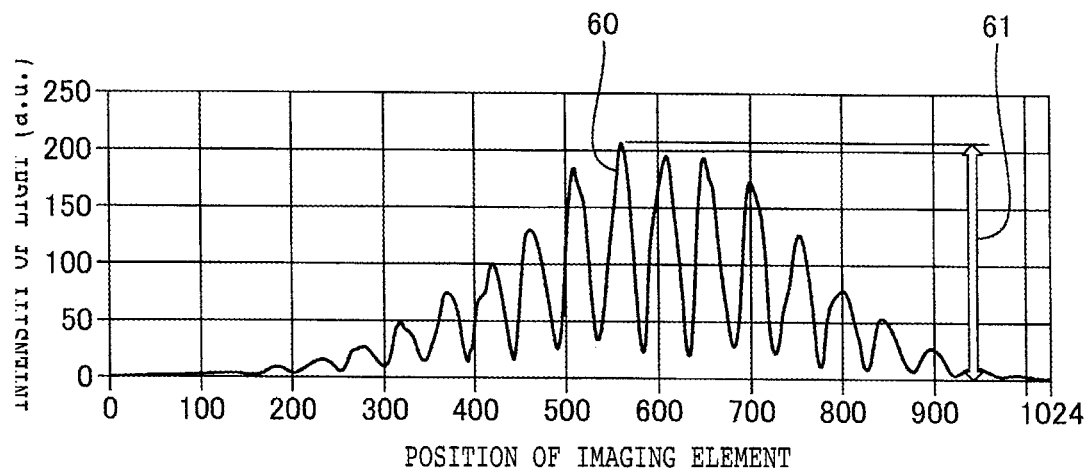
FIG. 6 is a diagram illustrating one example of an interference waveform acquired by the spectroscopic interferometer illustrated in FIG. 5.

Next, the spectroscopic interferometer 50 will be described. FIG. 5 is a diagram schematically illustrating a configuration of the spectroscopic interferometer of the laser processing apparatus illustrated in FIG. 3. FIG. 6 is a diagram illustrating one example of an interference waveform acquired by the spectroscopic interferometer illustrated in FIG. 5.

As illustrated in FIG. 5, the spectroscopic interferometer 50 irradiates the plate-shaped workpiece 1 held by the holding table 11 with light 52 from a light source 51. The spectroscopic interferometer 50 acquires an interference waveform 60 (exemplified in FIG. 6) between the light 52 reflected by the back surface 7 (hereinafter, referred to as light 521) and the light 52 that has been transmitted through the back surface 7 and been reflected by the front surface 3 (hereinafter, referred to as light 522). As illustrated in FIG. 5, the spectroscopic interferometer 50 includes the light source 51 that emits the light 52, a sensor head 53 facing the holding surface 12 of the holding table 11, a diffraction grating 54, and a line sensor 55.

In the first embodiment, the light source 51 is a super luminescent diode (SLD) light source and emits the light 52 whose wavelength is 1250 to 1350 nm. The sensor head 53 allows transmission therethrough of the light 52 emitted from the light source 51 to irradiate the plate-shaped workpiece 1 held by the holding table 11 with the light 52 and guides, to the diffraction grating 54, interference light between the light 521 reflected by the back surface 7 of the plate-shaped workpiece 1 and the light 522 that has been transmitted through the back surface 7 and been reflected by the front surface 3.

The diffraction grating 54 diffracts the interference light between the light 521 and the light 522 at an angle different for each wavelength and reflects the diffracted interference light toward the line sensor 55 to disperse the light 521 and the light 522 regarding each wavelength. Imaging elements are linearly disposed in the line sensor 55, and each imaging element in the line sensor 55 receives light 523 dispersed by the diffraction grating 54. The line sensor outputs information indicating intensity of the light 523 received by each imaging element toward the controller 100.

The spectroscopic interferometer 50 irradiates the plate-shaped workpiece 1 held by the holding table 11 with the light 52 from the light source 51, and disperses the interference light between the light 521 reflected by the back surface 7 and the light 522 that has been transmitted through the back surface 7 and been reflected by the front surface 3 by the diffraction grating 54 regarding each wavelength. Further, the spectroscopic interferometer 50 receives the dispersed light 523 by each imaging element of the line sensor 55 and acquires the interference waveform 60 illustrated in FIG. 6 to output the acquired interference waveform 60 to the controller 100. An abscissa axis of FIG. 6 indicates the position of each imaging element, and an ordinate axis indicates the intensity of the light 523 received by each imaging element. Moreover, a maximum value 61 of the intensity of the light 523 of the interference waveform 60 exemplified in FIG. 6 is a value corresponding to the resistivity of the plate-shaped workpiece 1 irradiated with the light 52 by the spectroscopic interferometer 50.

Figure 7:
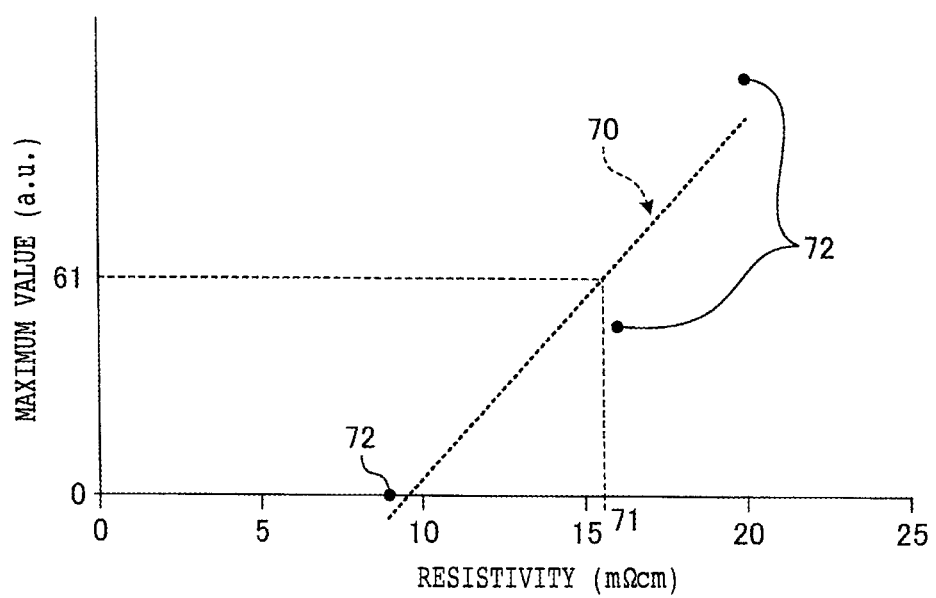
FIG. 7 is a diagram illustrating resistivity information stored by a storing section of a controller of the laser processing apparatus illustrated in FIG. 3.
Figure 8:
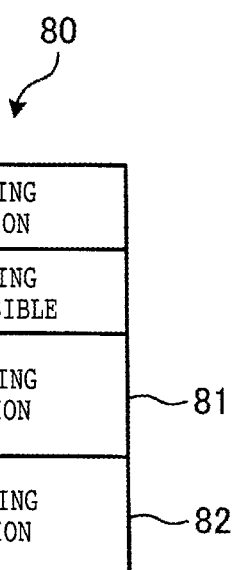
FIG. 8 is a diagram illustrating a determination condition stored by the storing section of the controller of the laser processing apparatus illustrated in FIG. 3.

Next, the controller 100 will be described. FIG. 7 is a diagram illustrating resistivity information stored by a storing section of the controller of the laser processing apparatus illustrated in FIG. 3. FIG. 8 is a diagram illustrating a determination condition stored by the storing section of the controller of the laser processing apparatus illustrated in FIG. 3.

The controller 100 controls the above-described respective constituent elements of the laser processing apparatus 10 and causes the laser processing apparatus 10 to execute processing operation for the plate-shaped workpiece 1. The controller 100 is a computer including a calculation processing device having a microprocessor like a central processing unit (CPU), a storing device having a memory like a read only memory (ROM) or a random access memory (RAM), and an input/output interface device. The calculation processing device of the controller 100 executes calculation processing in accordance with a computer program stored in the storing device and outputs a control signal for controlling the laser processing apparatus 10 to the above-described constituent elements of the laser processing apparatus 10 through the input/output interface device to implement functions of the controller 100.

Further, the laser processing apparatus 10 includes a display unit 110 that is display means configured by a liquid crystal display device or the like that displays a state of processing operation, an image, and so forth, an input unit 120 that is input means used when an operator inputs a processing condition or the like, an informing unit that is not illustrated, and so forth. The display unit 110, the input unit 120, and the informing unit are connected to the controller 100. The input unit 120 includes a touch panel provided in the display unit 110. The informing unit issues at least any of sound, light, or a message on the display unit 110 to inform the operator.

Moreover, as illustrated in FIG. 3, the controller 100 includes a processing control section 101 and a storing section 102. The processing control section 101 controls the above-described respective constituent elements of the laser processing apparatus 10 and causes the respective constituent elements of the laser processing apparatus 10 to execute processing operation for the plate-shaped workpiece 1.

The storing section 102 stores resistivity information 70 illustrated in FIG. 7 and a determination condition 80 illustrated in FIG. 8.

The resistivity information 70 associates the resistivity of multiple plate-shaped workpieces 1 of the same material and the same thickness with the maximum value 61 of the interference waveform 60 corresponding to the resistivity and indicates a relation between them. That is, the resistivity information 70 correlates the resistivity of multiple plate-shaped workpieces 1 of the same material and the same thickness with the maximum value 61 of the interference waveform 60 corresponding to the resistivity in a one-to-one relation. In the resistivity information 70 illustrated in FIG. 7, an abscissa axis indicates the resistivity of the multiple plate-shaped workpieces 1 of the same material and the same thickness, and an ordinate axis indicates the maximum value 61 of the interference waveform 60.

The resistivity information 70 is obtained by irradiating the multiple plate-shaped workpieces 1 whose resistivity is known and which are made of the same material and have the same thickness with the light 52 by the spectroscopic interferometer 50, acquiring the interference waveform 60, and approximating values of the known resistivity and actual measured values 72 of the maximum value 61 of the interference waveform 60 by the least-squares method or the like. The storing section 102 stores the resistivity information 70 corresponding to each material and each thickness of the plate-shaped workpiece 1. As above, the resistivity information 70 is obtained by acquiring the interference waveform 60 of the plate-shaped workpieces 1 with various values of the resistivity and associating the resistivity of the respective plate-shaped workpieces 1 with the maximum value 61 of the interference waveform 60 corresponding to the resistivity.

The determination condition 80 illustrated in FIG. 8 is a condition for determining a processing condition on the basis of the resistivity of the plate-shaped workpiece 1 of the processing target, the resistivity being obtained from the maximum value 61 of the interference waveform 60 acquired by the spectroscopic interferometer 50 and the resistivity information 70. In the first embodiment, the determination condition 80 stipulates that processing is impossible when the resistivity of the plate-shaped workpiece 1 is lower than a first value defined in advance. Further, the determination condition 80 stipulates that processing is executed under a processing condition set by the operator (in FIG. 8, described as processing condition 81) when the resistivity of the plate-shaped workpiece 1 is equal to or higher than the first value but is lower than a second value defined in advance. Moreover, the determination condition 80 stipulates that processing is executed under a processing condition 82 when the resistivity of the plate-shaped workpiece 1 is equal to or higher than the second value but is lower than a third value defined in advance.

The second value is larger than the first value, and the third value is larger than the second value. Further, the processing condition 82 is a condition under which it becomes harder to form the modified layer 8 than under the processing condition 81 set by the operator. For example, under the processing condition 82, an output power of the laser beam 21 is made weaker or the number of modified layers 8 formed in a thickness direction at the same planned dividing line 4 is made smaller than under the processing condition 81 set by the operator. As above, the determination condition 80 stipulates that, in the case of the resistivity with which processing for the plate-shaped workpiece 1 is possible, processing is executed under the processing conditions 81 and 82 with which it becomes harder to form the modified layer 8 as the resistivity becomes higher because it becomes easier to form the modified layer 8 as the resistivity becomes higher.

Functions of the processing control section 101 are implemented through execution of calculation processing by the calculation processing device in accordance with a computer program stored in the storing device. Functions of the storing section 102 are implemented by the above-described storing device.

Figure 9:
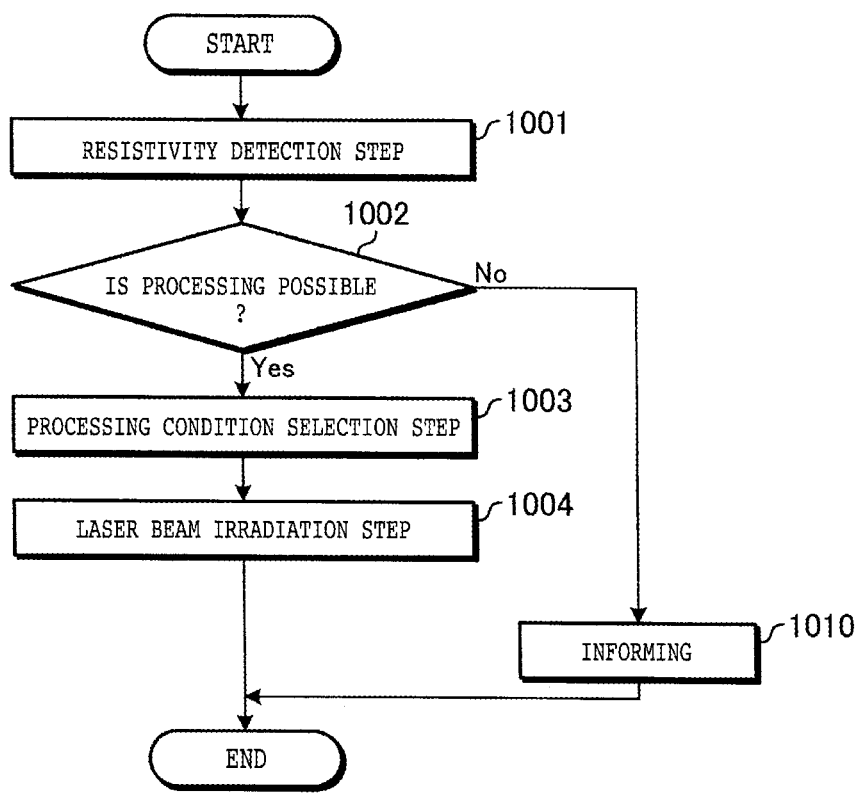
FIG. 9 is a flowchart illustrating a flow of the processing method of a plate-shaped workpiece according to the first embodiment.
Figure 10:
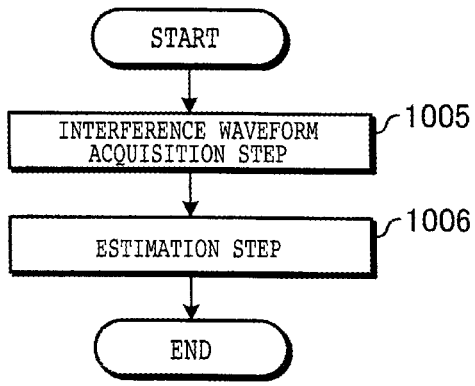
FIG. 10 is a flowchart illustrating a flow of a measurement method of resistivity according to the first embodiment.

Next, the processing method of a plate-shaped workpiece and a measurement method of resistivity according to the first embodiment will be described. FIG. 9 is a flowchart illustrating a flow of the processing method of a plate-shaped workpiece according to the first embodiment. FIG. 10 is a flowchart illustrating a flow of the measurement method of resistivity according to the first embodiment. The processing method of a plate-shaped workpiece according to the first embodiment is also processing operation of the laser processing apparatus 10.

The processing method of a plate-shaped workpiece according to the first embodiment is a method for processing the above-described plate-shaped workpiece 1. The processing method of a plate-shaped workpiece starts when the processing control section 101 of the controller 100 of the laser processing apparatus 10 has registered a processing condition input by an operator through operation of the input unit 120 and so forth, the front surface 3 side of the plate-shaped workpiece 1 has been placed on the holding surface 12 of the holding table 11, and the processing control section 101 of the controller 100 has accepted an instruction to start processing from the operator. The processing condition includes the material, thickness, and so forth of the plate-shaped workpiece 1 of the processing target. In the processing method of a plate-shaped workpiece, as illustrated in FIG. 9, a resistivity detection step 1001, a determination step 1002, a processing condition selection step 1003, and a laser beam irradiation step 1004 are executed.

The resistivity detection step 1001 is a step of detecting resistivity 71 (illustrated in FIG. 7) of the plate-shaped workpiece 1 of the processing target whose front surface 3 side is placed on the holding surface 12 of the holding table 11, with use of the measurement method of resistivity according to the first embodiment. The resistivity detection step 1001, that is, the measurement method of resistivity according to the first embodiment, is also a method for detecting the resistivity of the plate-shaped workpiece 1 whose front surface 3 side is placed on the holding surface 12 of the holding table 11. The resistivity detection step 1001, that is, the measurement method of resistivity according to the first embodiment, includes an interference waveform acquisition step 1005 and an estimation step 1006 as illustrated in FIG. 10.

The interference waveform acquisition step 1005 is a step of irradiating the back surface 7 of the plate-shaped workpiece 1 with the light 52 from the light source 51 and acquiring the interference waveform 60 between the light 521 reflected by the back surface 7 and the light 522 that has been transmitted through the back surface 7 and been reflected by the front surface 3. In the interference waveform acquisition step 1005, in the laser processing apparatus 10, the processing control section 101 of the controller 100 causes the holding surface 12 of the holding table 11 to hold under suction the front surface 3 of the plate-shaped workpiece 1 and controls the movement unit 30 to cause the movement unit to move the holding table 11 toward the processing region and position the plate-shaped workpiece 1 below the spectroscopic interferometer 50.

In the interference waveform acquisition step 1005, in the laser processing apparatus 10, the processing control section 101 of the controller 100 controls the spectroscopic interferometer 50 to cause the spectroscopic interferometer 50 to emit the light 52 from the light source 51 and irradiate the plate-shaped workpiece 1 with the light 52. In addition, interference light between the light 521 reflected by the back surface 7 and the light 522 reflected by the front surface 3 is dispersed by the diffraction grating 54 and is received by the line sensor 55. In the interference waveform acquisition step 1005, in the laser processing apparatus the spectroscopic interferometer 50 receives the interference light between the light 521 and the light 522 by the line sensor 55, acquires the interference waveform 60, and outputs the acquired interference waveform 60 to the controller 100.

The estimation step 1006 is a step of estimating the resistivity 71 of the plate-shaped workpiece 1 of the processing target on the basis of the interference waveform 60 acquired in the interference waveform acquisition step 1005. In the estimation step 1006, in the laser processing apparatus 10, the processing control section 101 of the controller 100 extracts the maximum value 61 from the interference waveform 60 and reads out the resistivity information 70 of the plate-shaped workpiece 1 with the material and thickness defined in the processing condition from the storing section 102. In the estimation step 1006, in the laser processing apparatus 10, the processing control section 101 of the controller 100 extracts the resistivity 71 corresponding to the maximum value 61 extracted from the interference waveform 60 in the resistivity information 70 read out from the storing section 102, for example. In this manner, in the estimation step 1006, the processing control section 101 of the controller 100 estimates the resistivity 71 of the plate-shaped workpiece 1 of the processing target on the basis of the maximum value 61 of the interference waveform 60 acquired in the interference waveform acquisition step 1005 and, in the estimation, calculates back the resistivity 71 of the plate-shaped workpiece 1 of the processing target on the basis of the resistivity information 70 stored in the storing section 102.

The determination step 1002 is a step of determining whether or not processing by irradiation with the laser beam 21 is possible for the plate-shaped workpiece 1 of the processing target having the detected resistivity 71, after the resistivity detection step 1001 is executed. In the first embodiment, in the determination step 1002, the processing control section 101 of the controller 100 reads out the determination condition 80 from the storing section 102 and determines whether or not the resistivity 71 estimated in the estimation step 1006, that is, the resistivity 71 detected in the resistivity detection step 1001, is lower than the first value, to determine whether or not processing is possible.

In the first embodiment, in the determination step 1002, when determining that the resistivity 71 estimated in the estimation step 1006, that is, the resistivity 71 detected in the resistivity detection step 1001, is lower than the first value, the processing control section 101 of the controller 100 determines that processing by irradiation with the laser beam 21 is not possible for the plate-shaped workpiece 1 of the processing target (determination step 1002: No). In the first embodiment, when determining in the determination step 1002 that processing by irradiation with the laser beam 21 is not possible for the plate-shaped workpiece 1 of the processing target, the processing control section 101 of the controller 100 causes the informing unit to execute informing (step 1010) and ends the processing method of a plate-shaped workpiece.

Further, in the first embodiment, in the determination step 1002, when determining that the resistivity 71 estimated in the estimation step 1006, that is, the resistivity 71 detected in the resistivity detection step 1001, is not lower than the first value, the processing control section 101 of the controller 100 determines that processing by irradiation with the laser beam 21 is possible for the plate-shaped workpiece 1 of the processing target (determination step 1002: Yes). In the first embodiment, when determining in the determination step 1002 that processing by irradiation with the laser beam 21 is possible for the plate-shaped workpiece 1 of the processing target, the processing control section 101 of the controller 100 proceeds to the processing condition selection step 1003.

The processing condition selection step 1003 is a step of selecting the processing condition corresponding to the resistivity estimated in the estimation step 1006. In the processing condition selection step 1003, the processing control section 101 of the controller 100 determines whether the resistivity 71 estimated in the estimation step 1006, that is, the resistivity 71 detected in the resistivity detection step 1001, is equal to or higher than the first value but is lower than the second value or is equal to or higher than the second value but is lower than the third value.

In the processing condition selection step 1003, when determining that the resistivity 71 estimated in the estimation step 1006, that is, the resistivity 71 detected in the resistivity detection step 1001, is equal to or higher than the first value but is lower than the second value, the processing control section 101 of the controller 100 refers to the determination condition 80 and selects the processing condition 81 set by the operator. On the other hand, in the processing condition selection step 1003, when determining that the resistivity 71 estimated in the estimation step 1006, that is, the resistivity 71 detected in the resistivity detection step 1001, is equal to or higher than the second value but is lower than the third value, the processing control section 101 of the controller 100 refers to the determination condition 80 and selects the processing condition 82.

The laser beam irradiation step 1004 is a step of irradiating the plate-shaped workpiece 1 of the processing target with the laser beam 21 to execute processing under the processing condition 81 or 82 selected in the processing condition selection step 1003. In the laser beam irradiation step 1004, in the laser processing apparatus 10, the processing control section 101 of the controller 100 controls the movement unit 30 to cause the movement unit 30 to position the plate-shaped workpiece 1 of the processing target below the imaging unit 40 and causes the back surface 7 of the plate-shaped workpiece 1 to be imaged by the imaging unit 40.

In the laser beam irradiation step 1004, in the laser processing apparatus 10, the processing control section 101 of the controller 100 detects a planned dividing line 4 from an image acquired through the imaging by the imaging unit 40 and performs alignment to execute position adjustment between the planned dividing line 4 and the laser beam irradiation unit 20. In the laser beam irradiation step 1004, in the laser processing apparatus 10, based on the processing condition 81 or 82 selected in the processing condition selection step 1003, as illustrated in FIG. 4, the processing control section 101 of the controller 100 positions the focal point 22 of the laser beam 21 with a wavelength having transmissibility with respect to the plate-shaped workpiece 1 inside the substrate 2 and irradiates the plate-shaped workpiece 1 with the pulsed laser beam 21 along the planned dividing line 4 from the back surface 7 side of the plate-shaped workpiece 1 while relatively moving the holding table 11 and the laser beam irradiation unit 20 along the planned dividing line 4.

As a result, in the plate-shaped workpiece 1, the modified layer 8 is formed inside the substrate 2 along the planned dividing line 4 as illustrated in FIG. 4 because the laser beam 21 has the wavelength having transmissibility with respect to the plate-shaped workpiece 1. In the laser beam irradiation step 1004, when having the modified layers 8 formed inside the substrate 2 along all the planned dividing lines 4, the laser processing apparatus 10 stops the irradiation with the laser beam 21 from the laser beam irradiation unit 20 and moves the holding table 11 to the carrying-in/out region, and thereafter, stops suction holding by the holding surface 12 to end the processing method of a plate-shaped workpiece, that is, the processing operation.

In the detection method of resistivity and the processing method of a plate-shaped workpiece according to the first embodiment described above, the resistivity information 70 in which the resistivity of the plate-shaped workpiece 1 is associated with the maximum value 61 of the interference waveform 60 is stored in the storing section 102 of the laser processing apparatus 10 in advance, the interference waveform 60 of the plate-shaped workpiece 1 of the processing target is acquired, and the resistivity 71 of the plate-shaped workpiece 1 of the processing target is estimated based on the maximum value 61 of the acquired interference waveform 60 and the resistivity information 70. As a result, the detection method of resistivity and the processing method of a plate-shaped workpiece according to the first embodiment provide an effect that it becomes possible to determine the resistivity 71 corresponding to the processability of the plate-shaped workpiece 1 without processing the plate-shaped workpiece 1.

Modification Example

Figure 11:
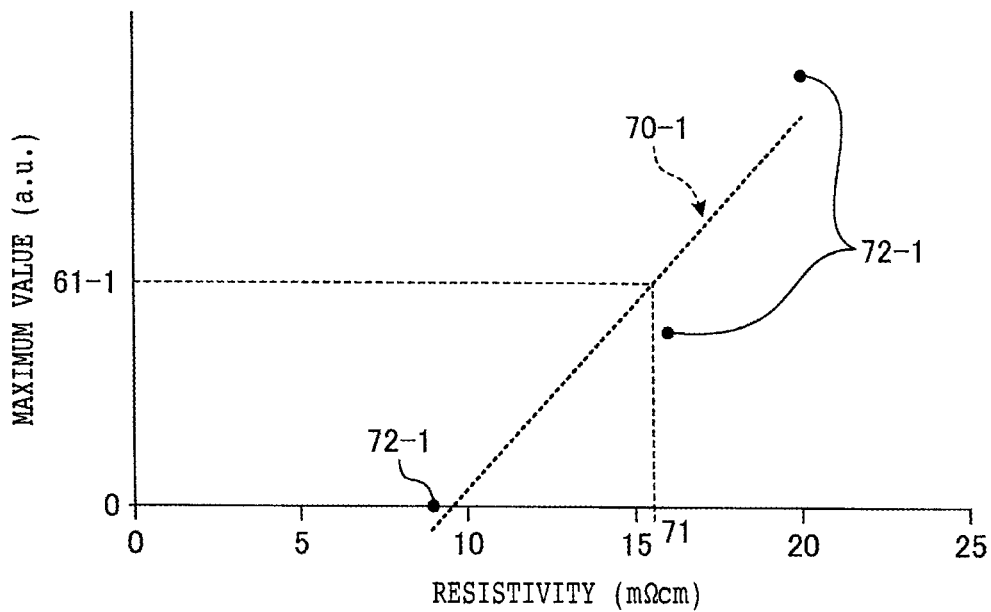
FIG. 11 is a diagram illustrating resistivity information stored by the storing section of the controller of the laser processing apparatus that executes a detection method of resistivity and a processing method of a plate-shaped workpiece according to a modification example of the first embodiment.
Figure 12:
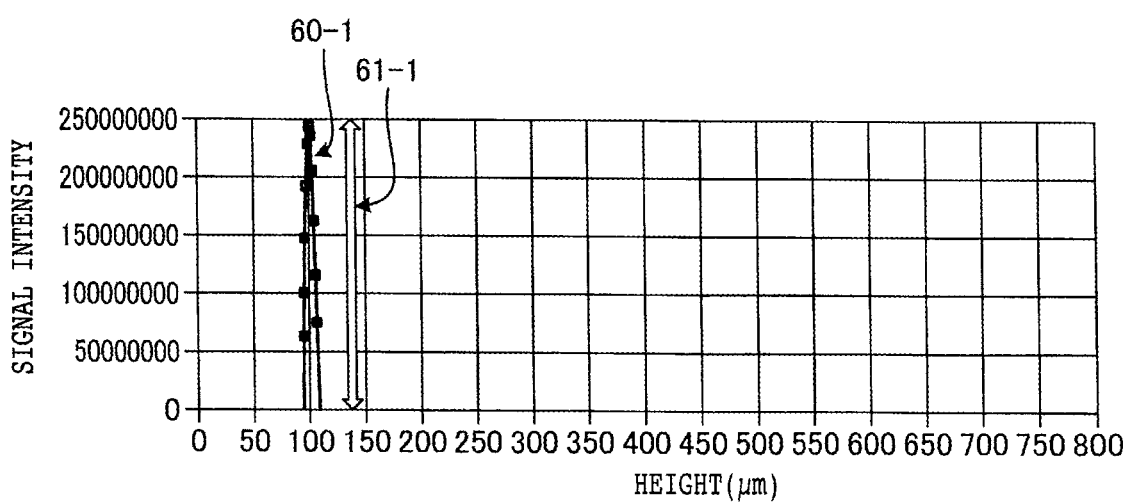
FIG. 12 is a diagram illustrating one example of a waveform obtained by performing a Fourier transform of the interference waveform acquired by the spectroscopic interferometer of the laser processing apparatus that executes the detection method of resistivity and the processing method of a plate-shaped workpiece according to the modification example of the first embodiment.

A detection method of resistivity and a processing method of a plate-shaped workpiece according to a modification example of the first embodiment of the present invention will be described based on the drawings. FIG. 11 is a diagram illustrating resistivity information stored by the storing section of the controller of the laser processing apparatus that executes the detection method of resistivity and the processing method of a plate-shaped workpiece according to the modification example of the first embodiment. FIG. 12 is a diagram illustrating one example of a waveform obtained by performing a Fourier transform of an interference waveform acquired by the spectroscopic interferometer of the laser processing apparatus that executes the detection method of resistivity and the processing method of a plate-shaped workpiece according to the modification example of the first embodiment.

The detection method of resistivity and the processing method of a plate-shaped workpiece according to the modification example of the first embodiment are the same as those in the first embodiment except that the controller 100 of the laser processing apparatus 10 stores resistivity information 70-1 illustrated in FIG. 11 in the storing section 102 in advance instead of the resistivity information 70 and, in the estimation step 1006, the resistivity 71 of the plate-shaped workpiece 1 is estimated based on a maximum value 61-1 of a waveform illustrated in FIG. 12 obtained by performing a Fourier transform of the interference waveform 60 acquired in the interference waveform acquisition step 1005 and the resistivity information 70-1.

The resistivity information 70-1 associates the resistivity of multiple plate-shaped workpieces 1 of the same material and the same thickness with the maximum value 61-1 of the waveform 60-1 exemplified in FIG. 12 obtained by performing a Fourier transform of the interference waveform 60 corresponding to the resistivity and indicates a relation between them. That is, the resistivity information 70-1 correlates the resistivity of multiple plate-shaped workpieces 1 of the same material and the same thickness with the maximum value 61-1 of the waveform 60-1 obtained by performing the Fourier transform of the interference waveform 60 corresponding to the resistivity, in a one-to-one relation. In the resistivity information 70-1 illustrated in FIG. 11, an abscissa axis indicates the resistivity of the multiple plate-shaped workpieces 1 of the same material and the same thickness, and an ordinate axis indicates the maximum value 61-1 of the waveform 60-1 resulting from the Fourier transform of the interference waveform 60. Further, in the waveform 60-1 illustrated in FIG. 12, an abscissa axis indicates the height of the back surface 7 of the plate-shaped workpiece 1, and an ordinates axis indicates a signal intensity.

The resistivity information 70-1 is obtained by irradiating the multiple plate-shaped workpieces 1 whose resistivity is known and which are made of the same material and have the same thickness with the light 52 by the spectroscopic interferometer 50, acquiring the interference waveform 60, and approximating values of the known resistivity and actual measured values 72-1 of the maximum value 61-1 of the waveform 60-1 resulting from the Fourier transform of the interference waveform 60 by the least-squares method. The storing section 102 stores the resistivity information 70-1 corresponding to each material and each thickness of the plate-shaped workpiece 1, as with the first embodiment. As above, the resistivity information 70-1 is obtained by performing the Fourier transform of the interference waveform 60 acquired from the plate-shaped workpieces 1 with various values of the resistivity and associating the resistivity of the respective plate-shaped workpieces 1 with the maximum value 61-1 of the waveform 60-1 resulting from the Fourier transform of the interference waveform 60 corresponding to the resistivity.

In the detection method of resistivity and the processing method of a plate-shaped workpiece according to the modification example of the first embodiment, in the estimation step 1006, in the laser processing apparatus 10, the processing control section 101 of the controller 100 performs a Fourier transform of the interference waveform 60 acquired from the plate-shaped workpiece 1 of the processing target in the interference waveform acquisition step 1005. In the modification example of the first embodiment, in the estimation step 1006, in the laser processing apparatus 10, the processing control section 101 of the controller 100 extracts the maximum value 61-1 from the waveform 60-1 obtained after the Fourier transform and reads out the resistivity information 70-1 of the plate-shaped workpiece 1 with the material and thickness defined in the processing condition from the storing section 102.

In the modification example of the first embodiment, in the estimation step 1006, in the laser processing apparatus 10, the processing control section 101 of the controller 100 extracts the resistivity 71 corresponding to the maximum value 61-1 extracted from the waveform 60-1 in the resistivity information 70-1 read out from the storing section 102. In this manner, in the estimation step 1006, the processing control section 101 of the controller 100 performs the Fourier transform of the interference waveform 60 acquired in the interference waveform acquisition step 1005 and estimates the resistivity 71 of the plate-shaped workpiece 1 of the processing target on the basis of the waveform 60-1 obtained after the transform. In addition, in the estimation, the processing control section 101 calculates back the resistivity 71 of the plate-shaped workpiece 1 of the processing target on the basis of the resistivity information 70-1 stored in the storing section 102.

In the detection method of resistivity and the processing method of a plate-shaped workpiece according to the modification example of the first embodiment, the resistivity information 70-1 in which the resistivity of the plate-shaped workpiece 1 is associated with the maximum value 61-1 of the waveform 60-1 resulting from a Fourier transform of the interference waveform 60 is stored in the storing section 102 of the laser processing apparatus 10 in advance, the interference waveform 60 of the plate-shaped workpiece 1 of the processing target is acquired, and the resistivity 71 of the plate-shaped workpiece 1 of the processing target is estimated based on the maximum value 61-1 of the waveform 60-1 obtained after the Fourier transform of the acquired interference waveform 60 and the resistivity information 70-1. This provides an effect that it becomes possible to determine the resistivity 71 corresponding to the processability of the plate-shaped workpiece 1 without processing the plate-shaped workpiece 1, as with the first embodiment.

Second Embodiment

Figure 13:
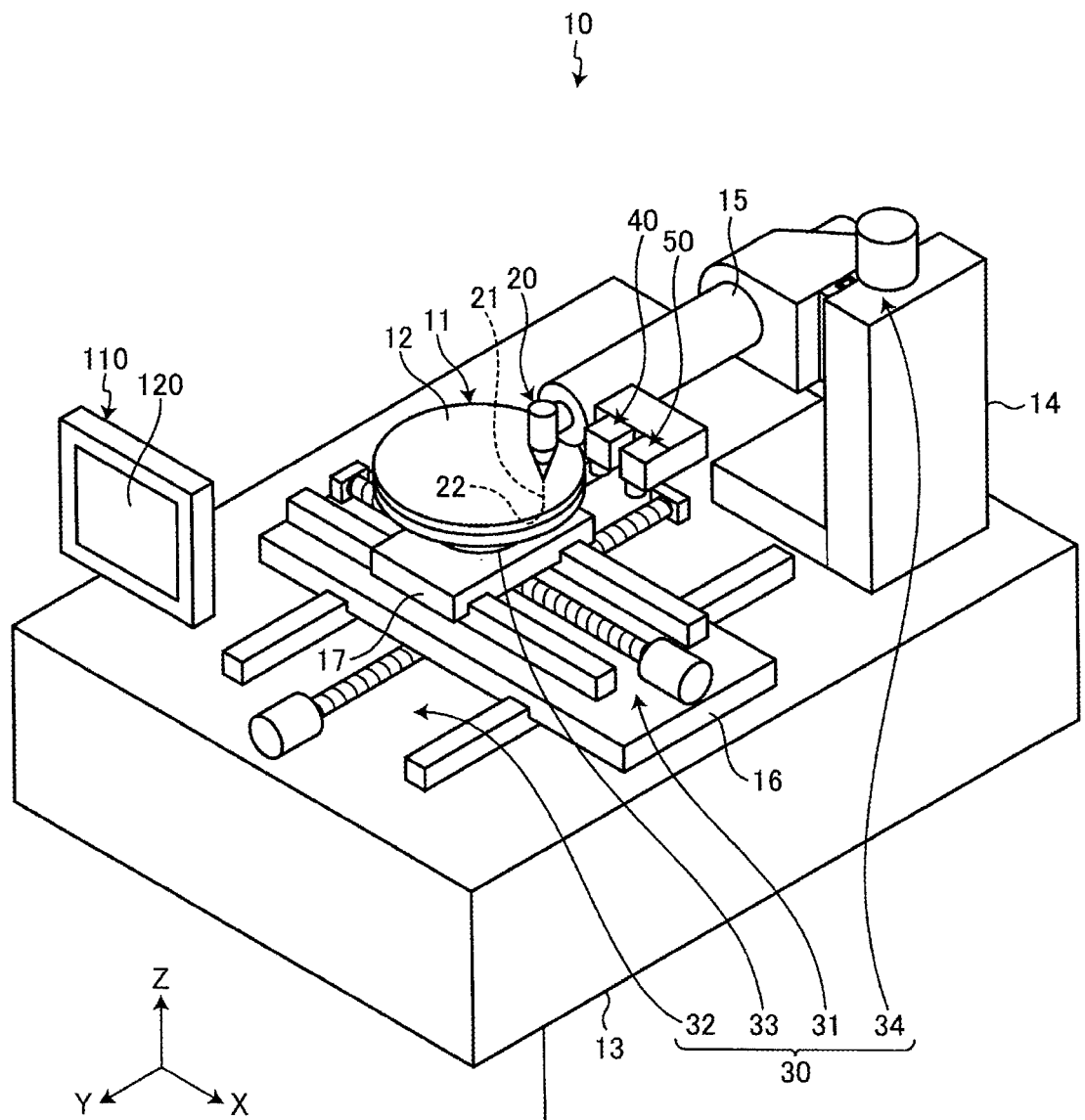
FIG. 13 is a perspective view illustrating a configuration example of the laser processing apparatus that executes a detection method of resistivity and a processing method of a plate-shaped workpiece according to a second embodiment.
Figure 14:
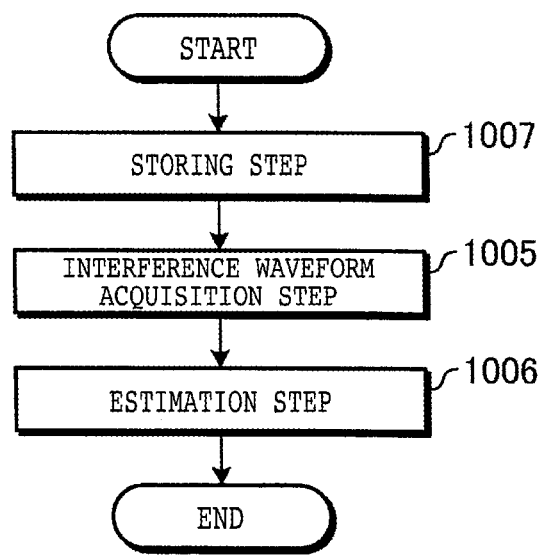
FIG. 14 is a flowchart illustrating a flow of a measurement method of resistivity according to the second embodiment.

A detection method of resistivity and a processing method of a plate-shaped workpiece according to a second embodiment of the present invention will be described based on the drawings. FIG. 13 is a perspective view illustrating a configuration example of the laser processing apparatus that executes the detection method of resistivity and the processing method of a plate-shaped workpiece according to the second embodiment. FIG. 14 is a flowchart illustrating a flow of a measurement method of resistivity according to the second embodiment. In FIG. 13 and FIG. 14, parts same as those of the first embodiment are given the same reference symbols, and description thereof is omitted.

The detection method of resistivity and the processing method of a plate-shaped workpiece according to the second embodiment are the same as those of the first embodiment and the modification example of the first embodiment except that the controller 100 of the laser processing apparatus 10 includes an information acquiring section 103 and the resistivity detection step 1001, that is, the detection method of resistivity, in the processing method of a plate-shaped workpiece is different. The information acquiring section 103 of the controller 100 acquires the resistivity information 70 or 70-1 and stores it in the storing section 102. Functions of the information acquiring section 103 are implemented through execution of calculation processing by the calculation processing device in accordance with a computer program stored in the storing device.

In the detection method of resistivity and the processing method of a plate-shaped workpiece according to the second embodiment, the resistivity detection step 1001, that is, the detection method of resistivity, further includes a storing step 1007 as illustrated in FIG. 14. The storing step 1007 is a step of executing the resistivity detection step 1001 of the first embodiment for plate-shaped workpieces 1 having various values of the resistivity, and storing the resistivity information 70 or 70-1 in the storing section 102 in advance. In the storing step 1007, in the laser processing apparatus 10, the information acquiring section 103 of the controller 100 sequentially holds multiple plate-shaped workpieces 1, which are made of the same material and have the same thickness as the plate-shaped workpiece 1 of the processing target and whose resistivity is known, on the holding surface 12 of the holding table 11 and acquires the interference waveform of each plate-shaped workpiece 1 by the spectroscopic interferometer 50.

In the second embodiment, in the estimation step 1006, in the laser processing apparatus 10, the processing control section 101 of the controller 100 calculates back the resistivity 71 of the plate-shaped workpiece 1 of the processing target on the basis of the resistivity information 70 or 70-1 stored in the storing step 1007, as with the first embodiment and the modification example. Further, in the second embodiment, in the estimation step 1006, in the laser processing apparatus 10, the processing control section 101 of the controller 100 performs a Fourier transform of the interference waveform 60 acquired in the interference waveform acquisition step 1005 and estimates the resistivity of the plate-shaped workpiece 1 on the basis of the maximum value 61-1 of the waveform 60-1 obtained after the Fourier transform, as with the modification example of the first embodiment.

In the detection method of resistivity and the processing method of a plate-shaped workpiece according to the second embodiment, the resistivity information 70 or 70-1 is stored in the storing step 1007, the interference waveform 60 of the plate-shaped workpiece 1 of the processing target is acquired, and the resistivity 71 of the plate-shaped workpiece 1 of the processing target is estimated based on the maximum value 61 of the acquired interference waveform 60 or the maximum value 61-1 of the waveform 60-1 obtained after a Fourier transform and the resistivity information 70-1. This provides an effect that it becomes possible to determine the resistivity 71 corresponding to the processability of the plate-shaped workpiece 1 without processing the plate-shaped workpiece 1, as with the first embodiment.

The present invention is not limited to the above-described embodiments. That is, the present invention can be carried out with various modifications without departing from the gist of the present invention. For example, in the present invention, only the measurement method of resistivity, that is, the interference waveform acquisition step 1005 and the estimation step 1006, or only the storing step 1007, the interference waveform acquisition step 1005, and the estimation step 1006 may be executed, and the determination step 1002, the processing condition selection step 1003, and the laser beam irradiation step 1004 do not necessarily need to be executed. Moreover, in the present invention, the resistivity information 70 or 70-1 relating to multiple plate-shaped workpieces 1 which are made of the same material and have the same thickness and whose resistivity is known may be acquired regarding each of different thicknesses, and the acquired resistivity information 70 or 70-1 of each of the multiple thicknesses may be stored in the storing section 102 of the laser processing apparatus 10. In this case, it becomes possible to estimate the resistivity 71 of the plate-shaped workpieces 1 with various thicknesses.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A detection method of resistivity in which resistivity of a plate-shaped workpiece doped with impurities and having a first surface and a second surface on a side opposite to the first surface is detected, the detection method comprising:
   an interference waveform acquisition step of irradiating the first surface of the plate-shaped workpiece with light from a light source and acquiring an interference waveform between light reflected by the first surface and light that has been transmitted through the first surface and been reflected by the second surface, wherein the interference waveform acquisition step is performed using a spectroscopic interferometer having the light source, a diffraction grating, and a line sensor; and
   an estimation step of estimating the resistivity of the plate-shaped workpiece on a basis of the interference waveform acquired in the interference waveform acquisition step, the estimated resistivity corresponding to the impurities doped on the plate-shaped workpiece,
   wherein the plate-shaped workpiece is a semiconductor wafer.

2. The detection method of resistivity according to claim 1, wherein, in the estimation step, the resistivity of the plate-shaped workpiece is estimated based on a maximum value of the interference waveform acquired in the interference waveform acquisition step.

3. The detection method of resistivity according to claim 2, further comprising:
   a storing step of executing the interference waveform acquisition step for plate-shaped workpieces having various values of resistivity and storing in advance resistivity information in which the resistivity of each of the plate-shaped workpieces is associated with the maximum value of the interference waveform corresponding to the resistivity, wherein,
   in the estimation step, the resistivity of the plate-shaped workpiece is calculated back based on the resistivity information stored in the storing step.

4. The detection method of resistivity according to claim 1, wherein, in the estimation step, a Fourier transform of the interference waveform acquired in the interference waveform acquisition step is performed, and the resistivity of the plate-shaped workpiece is estimated based on a maximum value of a waveform obtained after the transform.

5. The detection method of resistivity according to claim 4, further comprising:
   a storing step of executing the interference waveform acquisition step for plate-shaped workpieces having various values of resistivity and storing in advance resistivity information in which the resistivity of each of the plate-shaped workpieces is associated with the maximum value of the waveform resulting from the Fourier transform of the interference waveform corresponding to the resistivity, wherein,
   in the estimation step, the resistivity of the plate-shaped workpiece is calculated back based on the resistivity information stored in the storing step.

6. The detection method of resistivity according to claim 1, wherein the estimation step includes reading out stored resistivity information associated with a known thickness of the plate-shaped workpiece.

7. A processing method of a plate-shaped workpiece in which a plate-shaped workpiece doped with impurities and having a first surface and a second surface on a side opposite to the first surface is processed, the processing method comprising:
   a resistivity detection step of detecting resistivity of the plate-shaped workpiece, the detected resistivity corresponding to the impurities doped on the plate-shaped workpiece;
   a processing condition selection step of selecting a processing condition corresponding to the resistivity;
   a laser beam irradiation step of irradiating the plate-shaped workpiece with a laser beam to execute processing under the processing condition selected in the processing condition selection step;
   a determination step of determining whether processing by irradiation with the laser beam is possible for the plate-shaped workpiece having the detected resistivity; and
   a processing step of processing the plate-shaped workpiece if the determination step determines that processing the plate-shaped workpiece by irradiation with the laser beam is possible,
   wherein:
   the resistivity detection step includes
      an interference waveform acquisition step of irradiating the first surface of the plate-shaped workpiece with light from a light source and acquiring an interference waveform between light reflected by the first surface and light that has been transmitted through the first surface and been reflected by the second surface, and
      an estimation step of estimating the resistivity of the plate-shaped workpiece on a basis of the interference waveform acquired in the interference waveform acquisition step
      the processing of the plate-shaped workpiece is forming modified layers within the workpiece with the laser beam, and
      wherein the plate-shaped workpiece is a semiconductor wafer.

8. The processing method of a plate-shaped workpiece according to claim 7, wherein:
   the determination step includes comparing the estimated resistivity to a first value, a second value, and a third value; and
   when the estimated resistivity is lower than the first value, the plate-shaped workpiece is not processed in the processing step,
   when the estimated resistivity is equal to or greater than the first value but less than the second value, the plate-shaped workpiece is processed under a first processing condition in the processing step, and
   when the estimated resistivity is equal to or greater than the second value but less than the third value, the plate-shaped workpiece is processed under a second processing condition in the processing step.

9. The processing method of a plate-shaped workpiece according to claim 8, wherein:
   when the plate-shaped workpiece is processed under the first processing condition, the laser beam is applied to the plate-shaped workpiece with a first processing power, and
   when the plate-shaped workpiece is processed under the second processing condition, the laser beam is applied to the plate-shaped workpiece with a second processing power.

10. The processing method of a plate-shaped workpiece according to claim 7, wherein the mechanical strength of the modified layer is lower than the mechanical strength of surrounding regions within the plate-shaped workpiece.

11. The processing method of a plate-shaped workpiece according to claim 7, wherein the modified layer includes at least one of a melting treatment region, a crack region, a dielectric breakdown region, and a refractive index change region.

12. The processing method of a plate-shaped workpiece according to claim 7, wherein the modified layer is a region of the plate-shaped workpiece in which at least one of a density, a refractive index, and a mechanical strength is different than surrounding regions within the plate-shaped workpiece.

13. The processing method of a plate-shaped workpiece according to claim 7, wherein the interference waveform acquisition step is performed using a spectroscopic interferometer having the light source, a diffraction grating, and a line sensor.

14. The processing method of a plate-shaped workpiece according to claim 7, wherein the estimation step includes using a maximum value of the interference waveform to estimate the resistivity of the plate-shaped workpiece.

15. The processing method of a plate-shaped workpiece according to claim 7, wherein the estimation step includes reading out stored resistivity information associated with a known thickness of the plate-shaped workpiece.

16. A processing method of a plate-shaped workpiece in which a plate-shaped workpiece doped with impurities and having a first surface and a second surface on a side opposite to the first surface is processed, the processing method comprising:
    a resistivity detection step of detecting resistivity of the plate-shaped workpiece;
    a processing condition selection step of selecting a processing condition corresponding to the resistivity;
    a laser beam irradiation step of irradiating the plate-shaped workpiece with a laser beam to execute processing under the processing condition selected in the processing condition selection step;
    a determination step of determining whether processing by irradiation with the laser beam is possible for the plate-shaped workpiece having the detected resistivity; and
    a processing step of processing the plate-shaped workpiece if the determination step determines that processing the plate-shaped workpiece by irradiation with the laser beam is possible,
wherein:
    the resistivity detection step includes:
        an interference waveform acquisition step of irradiating the first surface of the plate-shaped workpiece with light from a light source and acquiring an interference waveform between light reflected by the first surface and light that has been transmitted through the first surface and been reflected by the second surface, and
        an estimation step of estimating the resistivity of the plate-shaped workpiece on a basis of the interference waveform acquired in the interference waveform acquisition step, the estimated resistivity corresponding to the impurities doped on the plate-shaped workpiece; and
    the determination step includes:
        comparing the estimated resistivity to a first value, a second value, and a third value, and
        when the estimated resistivity is lower than the first value, the plate-shaped workpiece is not processed in the processing step,
        when the estimated resistivity is equal to or greater than the first value but less than the second value, the plate-shaped workpiece is processed under a first processing condition in which the laser beam is applied to the plate-shaped workpiece with a first processing power in the processing step, and
        when the estimated resistivity is equal to or greater than the second value but less than the third value, the plate-shaped workpiece is processed under a second processing condition in which the laser beam is applied to the plate-shaped workpiece with a second processing power in the processing step,
wherein the plate-shaped workpiece is a semiconductor wafer.

* * * * *